(12) United States Patent
Govaerts et al.

(10) Patent No.: US 6,906,145 B2
(45) Date of Patent: Jun. 14, 2005

(54) BONDING OF A FLUOROPOLYMER LAYER TO A SUBSTRATE

(75) Inventors: Ludo Govaerts, Ranst (BE); Dirk H. Arren, Schoten (BE); Tatsuo Fukushi, Woodbury, MN (US); William D. Coggio, Hudson, WI (US); Klaus Hintzer, Kastl (DE); Harald Kaspar, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 185 days.

(21) Appl. No.: 10/282,677

(22) Filed: Oct. 29, 2002

(65) Prior Publication Data

US 2003/0118765 A1 Jun. 26, 2003

Related U.S. Application Data

(60) Provisional application No. 60/336,405, filed on Oct. 31, 2001.

(51) Int. Cl.⁷ ............................ C08L 27/22; C08F 8/06; C08F 8/12; C08F 8/42
(52) U.S. Cl. ................ 525/326.3; 104/326.2; 104/343; 104/370; 104/384; 104/387
(58) Field of Search ................. 525/370, 384, 525/387, 104, 326.2, 326.3, 343, 132; 524/174

(56) References Cited

U.S. PATENT DOCUMENTS

| | | | |
|---|---|---|---|
| 3,876,654 A | | 4/1975 | Pattison |
| 4,214,060 A | | 7/1980 | Apotheker et al. |
| 4,233,421 A | | 11/1980 | Worm |
| 4,264,181 A | * | 4/1981 | Lentz et al. ................ 399/324 |
| 4,501,869 A | | 2/1985 | Tatemoto et al. |
| 4,745,165 A | | 5/1988 | Arcella et al. |
| 4,831,085 A | | 5/1989 | Okabe et al. |
| 4,912,171 A | | 3/1990 | Grootaert et al. |
| 5,086,123 A | | 2/1992 | Guenthner et al. |
| 5,217,837 A | | 6/1993 | Henry et al. |
| 5,262,490 A | | 11/1993 | Kolb et al. |
| 5,401,570 A | * | 3/1995 | Heeks et al. ................ 428/332 |
| 5,591,804 A | | 1/1997 | Coggio et al. |
| 5,656,697 A | * | 8/1997 | Wlassics et al. ......... 525/326.3 |
| 5,929,169 A | | 7/1999 | Jing et al. |
| 6,020,038 A | | 2/2000 | Chen et al. |
| 6,146,751 A | | 11/2000 | Chen et al. |
| 6,447,916 B1 | | 9/2002 | Van Gool |

FOREIGN PATENT DOCUMENTS

| | | |
|---|---|---|
| EP | 0 661 304 A1 | 7/1995 |
| EP | 0 761 735 A1 | 3/1997 |
| EP | 0 769 521 A1 | 4/1997 |
| EP | 0 784 064 A1 | 7/1997 |

OTHER PUBLICATIONS

*Encyclopedia of Polymer Science & Engineering*, Second Edition, V. 15, *Silicones*, pp. 204–308, John Wiley & Sons, 1989.
*Journal of American Chemical Society*, V. 116, 1994, pp. 4521–4522.

* cited by examiner

*Primary Examiner*—Kelechi C. Egwim
(74) *Attorney, Agent, or Firm*—James V. Lilly; Brian E. Szymanski

(57) ABSTRACT

The present invention comprises a substrate having a fluoropolymer on at least one of its surfaces wherein one of the substrates or the fluoropolymer comprises a hydride function MH wherein M is Si, Ge, Sn or Pb. The invention further comprises articles comprising the substrate and fluoropolymer; a method of bonding the fluoropolymer to the substrate; a fluoropolymer composition that contains the fluoropolymer, a polyhydroxy cure composition, and an organic composition comprising the hydride function MH; a premix that contains the fluoropolymer and the hydride function MH; and a fluoropolymer composition that comprises (a) a thermoplastic fluoropolymer comprising Cl, Brand/or I atoms and (b) an organic compound that comprises the hydride function MH.

4 Claims, 1 Drawing Sheet

BONDING OF A FLUOROPOLYMER LAYER TO A SUBSTRATE

This application claims the benefit under 35 U.S.C. 119(e) of U.S. provisional application No. 60/336,405, filed Oct. 31, 2001.

FIELD

The present invention relates to an improvement in bonding of a fluoropolymer, i.e. a polymer having a fluorinated backbone, to a substrate such as for example a non-fluorinated elastomer, silicone elastomer or even another fluoropolymer such as for example a layer of a thermoplastic fluoropolymer. In particular, the present invention relates to the use of an organic compound having a hydride function MH, wherein M is selected from Si, Ge, Sn and Pb to improve the bonding properties of a fluoropolymer.

BACKGROUND

The beneficial properties of fluoropolymers are well known in the art and include for example, high temperature resistance, high chemical resistance including for example high resistance to solvents, fuels and corrosive chemicals, and non-flammability. Because of these beneficial properties, fluoropolymers find wide application particularly where materials are exposed to high temperature and/or chemicals.

For example, fluoropolymers are used in fuel management systems which include for example fuel tanks, fuel filler lines and fuel supply lines in cars or other motor vehicles because of their excellent resistance to fuels and because of the good barrier properties that can be achieved with fluoropolymers. Additionally, fluoropolymers, in particular fluoroelastomers, may be used in a hose connecting the compressor of a turbo engine with an intercooler. Because of the high temperature of the compressed air, non-fluorine elastomers such as ethylene acrylic based elastomers or silicone elastomers cannot be used for such a hose.

Fluoropolymers are generally more expensive than non-fluorine polymers and accordingly, materials have been developed in which the fluoropolymer is used in combination with other materials to reduce the overall cost of an article. For example, in the aforementioned hose used in turbo engines, it has been proposed to use a relatively thin layer of fluoroelastomer as an inner layer of a multilayer hose where the outerlayer of the hose is then a non-fluorine elastomer such as for example a silicone elastomer. It is required in such a multilayer hose that the fluoropolymer layer be firmly and reliably bonded to the other layers of the hose. Unfortunately, bonding of fluoropolymers to other substrates is often difficult and in particular bonding to silicone elastomers has been found difficult. This is further complicated by the fact that various silicone compositions exist such that in one instance a particular fluoropolymer composition may show good bonding, yet in another instance satisfactory bonding may not be obtained. To solve this problem, tie layers have been proposed between the fluoropolymer and other materials such as a silicone elastomer, but this increases cost and makes the manufacturing more complicated.

A further application in which a multi-layer article including a fluoropolymer layer is used is in a fuser member of a plain paper copier. Such a fuser member typically has a thermally conductive silicone elastomer which is bonded to a fluoroelastomer surface layer which may also include conductive particles. Such a fuser member is disclosed in for example U.S. Pat. No. 5,217,837. This U.S. patent describes a multilayer fuser member in which the silicone elastomer is bonded to the fluoroelastomer with the intermediate of an adhesive layer. The manufacturing of such a fuser member is unfortunately cumbersome. A similar system is described in U.S. Pat. No. 6,020,038.

Further, in certain applications, it may further be desirable to bond fluoropolymers of different nature and composition to each other. For example, in a fuel supply line, it may be desirable to bond a fluoroelastomer layer to fluorothermoplastic polymer layer. Although both polymers are fluoropolymers, desired bond strength may still not be achieved.

Accordingly, it would be desirable to find a way of improving bonding of a fluoropolymer to other substrates such as for example non-fluorine elastomers, silicone rubbers and other fluoropolymers. Preferably, this solution is cost effective, convenient and reliable and can be applied to a wide variety of substrates.

SUMMARY

In one embodiment, the present invention provides a material comprising a substrate having on at least one surface thereof a fluoropolymer layer comprising a fluoropolymer. The fluoropolymer layer and/or the substrate comprises an organic compound comprising a hydride function MH, wherein M is selected from Si, Ge, Sn and Pb. This material can be formed into an article in which the fluoropolymer is firmly bonded to the substrate by reacting the fluoropolymer layer to the substrate. Accordingly, the invention further provides the article that is obtained from reacting the fluoropolymer layer to the substrate.

In a further aspect, the present invention provides a method of bonding a fluoropolymer to a substrate comprising reacting the fluoropolymer layer to the substrate in the presence of an organic compound having a hydride group comprising a hydride function MH, wherein M is selected from Si, Ge, Sn and Pb.

It has been found in connection with the present invention that a fluoropolymer layer can be effectively bonded to a substrate if an organic compound having a hydride function MH is present. In particular, good bonding of a fluoroelastomer layer to other elastomers, including non-fluorine type elastomers such as silicone rubbers can be obtained. Surprisingly, these good bonding properties can be obtained with a wide variety of silicone rubber compositions.

In a further aspect, the present invention relates to a particular fluoropolymer composition that can be used for bonding a fluoroelastomer layer to a substrate. This aspect of the invention provides a fluoropolymer composition that comprises:

(a) a fluoropolymer;
(b) a cure composition comprising a polyhydroxy compound; and
(c) an organic compound comprising a hydride function MH, wherein M is selected from Si, Ge, Sn and Pb.

In yet a still further aspect, the present invention provides a premix for providing a curable fluoropolymer composition, said premix comprising a fluoropolymer and an organic compound comprising a hydride function MH, wherein M is selected from Si, Ge, Sn and Pb, and said curable fluoropolymer composition being obtainable from said premix by adding thereto one or more components of a cure composition.

In a further aspect, a fluoropolymer composition is provided that comprises:

(a) a thermoplastic fluoropolymer comprising chlorine, bromine and/or iodine atoms; and
(b) an organic compound comprising a hydride function MH, wherein M is selected from Si, Ge, Sn and Pb.

BRIEF DESCRIPTION OF THE DRAWINGS

The following figures are included by way of further illustration of some embodiments of the present invention. It will be understood that these drawings merely serve to illustrate the invention without limiting the invention in any way thereto.

DETAILED DESCRIPTION

Figure 1:
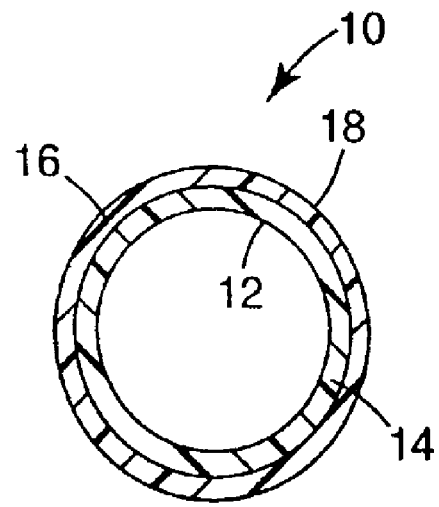
FIGS. 1 and 2 are cross-sectional schematic representations of a multi-layer hose or tube that can be obtained with the invention.

The organic compound having one or more hydride functions MH may either be a simple organic compound or a polymeric compound. By "polymeric compound" is meant that the compound comprises repeating units that are actually or conceptually derived from lower molecular weight compounds, i.e. monomers. The polymerization degree may vary widely and includes a low polymerization degree such as for example a polymerization degree of 2 to 50 repeating units as well as a large polymerization degree of more than 50. Thus, the term "polymeric compound" should be understood to include oligomeric compounds that typically have a low polymerization degree. If the organic compound is polymeric, the hydride function may be contained in the terminating group of the polymeric chain and/or in a repeating unit of the polymeric compound.

The organic compound having one or more MH functions is typically a non-fluorinated compound although the possibility of using an organic compound that has fluorine substituents is not excluded.

In one embodiment of the present invention, the organic compound is a siloxane or a silazane that comprises one or more MH functions. Typically, when the organic compound is a siloxane or a silazane, the MH functions will be —SiH functions. Preferably, the SiH function will be an —OSiH or a —NSiH whereby the hydrogen is attached to a silicon atom that is further bonded to an oxygen or nitrogen atom. The siloxane or silazane may be a simple low molecular weight organic compound or may be a polymeric compound including for example a polysiloxane which may be linear, branched or cyclic.

Examples of low molecular weight siloxanes include for example alkoxy silanes corresponding to the formula:

$$(R^a)_s(R^bO)_t SiH_w \quad (I)$$

wherein each $R^a$ independently represents an alkyl group such as for example methyl or ethyl or another lower alkyl ($C_1$–$C_7$ alkyl group) or an alkyl group substituted with a substituent such as for example an aryl group, an ester, an alkoxy etc., or aryl group optionally substituted such as for example with an alkyl group, an ester, an alkoxy etc.; each $R^b$ independently represents an alkyl group, preferably a lower alkyl group and which may optionally be substituted; t and w represent an integer of at least 1 and the sum of s+t+w being 4. Examples of siloxanes according to the above formula include $HSi(OCH_2CH_3)_3$ and $(CH_3)_2(CH_3CH_2O)SiH$.

In accordance with another embodiment of the present invention, the organic compound is a polysiloxane (oligomer or polymer), comprising a polysiloxy backbone. Such polymer or oligomer may be terminated by a group containing one or more SiH functions and/or may contain SiH groups distributed along the backbone. The SiH groups may form part of the backbone or they can be present in a side group attached to the backbone.

For example, the polysiloxanes for use with this invention include those that correspond to the formula:

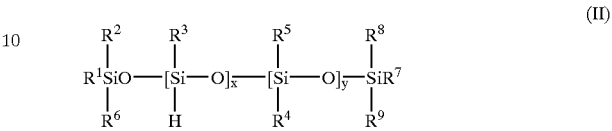

wherein $R^1$, $R^2$, $R^3$, $R^6$, $R^7$, $R^8$ and $R^9$ each independently represents hydrogen, an alkoxy group, an alkyl optionally substituted such as for example with an aryl group, an ester, an alkoxy etc., or aryl group optionally substituted such as for example with an alkyl group, an ester, an alkoxy etc.; $R^4$ and $R^5$ each independently represents an alkoxy group, an alkyl or aryl group each of which may optionally be substituted, x represents a value of 0 to 150, y represents a value of 0 to 150 and with the proviso that when x=0, at least one of $R^1$, $R^2$, $R^6$, $R^7$, $R^8$ and $R^9$ represents a hydrogen atom.

Specific examples of siloxanes include 1,1,3,3 tetraisopropyl disiloxane, diphenyl-1,1,3,3-tetrakis(dimethylsiloxy) disiloxane available from United Chem, silylhydride terminated poly(dimethylsiloxane), poly(methyl hydro siloxane) and copolymers of dimethylsiloxane and methylhydrosiloxane.

Further siloxanes that can be used may be cyclic such as those corresponding to the formula:

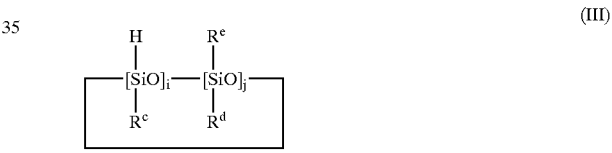

wherein $R^c$ represents hydrogen, an alkyl group or an aryl group, $R^d$ and $R^e$ each independently represents an alkyl or aryl group, i is at least 1 and the sum of i+j is at least 3. Specific examples of cyclic siloxanes according to the above formula are 1,3,5-trimethyl cyclosiloxane and 1-phenyl-3,3,5,5-tetramethyl cyclosiloxane.

Polysiloxanes and siloxanes having SiH groups are known in the art and can be produced according to well-known procedures such as disclosed in for example: Encyclopedia of Polymer Science and Engineering, Second Edition, V15, Silicones, pgs. 204–308, John Wiley & Sons, 1989. Siloxanes having SiH groups are also generally commercially available. Preferably, the siloxane or polysiloxane will have a molecular weight between 150 g/mol and 10,000 g/mol.

Suitable silazanes for use with the invention include for example disilazanes corresponding to the formula:

wherein u is 1 or 2, $R^f$ and $R^h$ each independently represents an alkyl group or an aryl group and $R^g$ represents hydrogen, an alkyl group or an aryl group. A specific example of a silazane is $HSi(CH_3)_2$—NH—$Si(CH_3)_2H$.

In a further embodiment of the present invention, the organic compound corresponds to the formula:

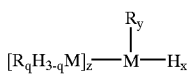
(V)

wherein R represents a hydrocarbon group optionally comprising one or more substituents and wherein the R groups may be the same or different and whereby two R groups may be linked to each other so as to form a ring, M is selected from Si, Ge, Sn and Pb, q is a value of 1 to 3, x is a value of 1 to 3, y and z represent a value of 0 to 3 and the sum of y+z=4−x.

Examples of substituents that may be present on the hydrocarbon group R include alkoxy, aryloxy, halogens such as chlorine and bromine, nitrile groups, hydroxy groups and amino groups. The backbone of the hydrocarbon group may further be interrupted by one or more heteroatoms such as for example oxygen and nitrogen atoms. Typical examples of hydrocarbon groups include saturated or unsaturated linear, branched or cyclic aliphatic groups and aromatic groups. Specific examples are $C_1$–$C_5$ alkyl groups, aryl groups having 6 to 12 carbon atoms, arylalkyl and alkylaryl groups having 7 to 14 carbon atoms.

Compounds according to formula (V) include in particular those according to formula (VI):

$$R_ySi-H_x \quad (VI)$$

wherein R, y and x have the same meaning as above. Preferably, R in the above formula (VI) is an aryl group such as for example phenyl.

Compounds of formula (V) and (VI) are known and have been described in for example J. Am. Chem. Soc., 116 (1994), page 4521–4522. Examples of compounds according to formula V include tri(n-butyl)tin hydride, tri(ethyl) silyl hydride, di(trimethylsilyl)silylmethyl hydride, tri (trimethylsilyl)silyl hydride, tri(phenyl)silyl hydride. Compounds of formula (V) have further been disclosed in EP 761 735.

The organic compound is typically included in a composition for providing the fluoropolymer layer. However, this may not be necessary and it is also contemplated that the organic compound is included in the substrate to which the fluoropolymer is to be bonded in particular in the surface layer of the substrate to which the fluoropolymer is being bonded. The amount of organic compound used in a composition for providing the fluoropolymer layer may vary widely and the optimal amount can be readily determined by one skilled in the art through routine experimentation. Typically, an amount of 0.01% by weight to 5% by weight, preferably between 0.1% by weight and 4% by weight based on the weight of fluoropolymer is included in the composition for preparing the fluoropolymer layer.

The fluoropolymer of the fluoropolymer layer may have a partially or fully fluorinated backbone. Particularly preferred fluoropolymers are those that have a backbone that is at least 30% by weight fluorinated, preferably at least 50% by weight fluorinated, more preferably at least 65% by weight fluorinated.

Examples of fluoropolymers for use in this invention include polymers of one or more fluorinated monomers optionally in combination with one or more non-fluorinated monomers. Examples of fluorinated monomers include fluorinated $C_2$–$C_8$ olefins that may have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include vinyl chloride, vinylidene chloride and $C_2$–$C_8$ olefins such as ethylene (E) and propylene (P).

Examples of perfluorovinyl ethers that can be used in the invention include those that correspond to the formula:

$$CF_2=CF-O-R_f$$

wherein $R_f$ represents a perfluorinated aliphatic group that may contain one or more oxygen atoms.

Particularly preferred perfluorinated vinyl ethers correspond to the formula:

$$CF_2=CFO(R^a_fO)_n(R^b_fO)_mR^c_f$$

wherein $R^a_f$ and $R^b_f$ are different linear or branched perfluoroalkylene groups of 1–6 carbon atoms, in particular 2 to 6 carbon atoms, m and n are independently 0–10 and $R^c_f$ is a perfluoroalkyl group of 1–6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxyethylvinyl ether and $CF_3-(CF_2)_2-O-CF(CF_3)-CF_2-O-CF(CF_3)-CF_2-O-CF=CF_2$.

Suitable perfluoroalkyl vinyl monomers correspond to the general formula:

$$CF_2=CF-R^d_f \text{ or } CH_2=CH-R^d_f$$

wherein $R^d_f$ represents a perfluoroalkyl group of 1 to 10, preferably 1 to 5 carbon atoms. A typical example of a perfluoroalkyl vinyl monomer is hexafluoropropylene.

The fluoropolymers for use in connection with the present invention can be made in accordance with any of the known polymerization methods for making fluoropolymers. Such methods include without limitation, aqueous emulsion polymerization, suspension polymerization and polymerization in an organic solvent.

According to a particular embodiment, the fluoropolymer is a substantially amorphous polymer that shows hardly any melting point if at all. Such fluoropolymers are particularly suitable for providing fluoroelastomers, which are typically obtained upon curing of an amorphous fluoropolymer. Amorphous fluoropolymers include for example copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Specific examples of copolymers include for example copolymers having a combination of monomers as follows: VDF-HFP, TFE-P, VDF-TFE-HFP, VDF-TFE-PVE, TFE-PVE, E-TFE-PVE and any of the aforementioned copolymers further including units derived from a chlorine containing monomer such as CTFE. Still further examples of suitable amorphous copolymers include copolymers having a combination of monomers as in CTFE-P.

Preferred amorphous fluoropolymers generally comprise from 20 to 85%, preferably 50 to 80% by moles of repeating units derived from VDF, TFE and/or CTFE, copolymerized with one or more other fluorinated ethylenically unsaturated monomer and/or one or more non fluorinated $C_2$–$C_8$ olefins, such as ethylene and propylene. The units derived from the fluorinated ethylenically unsaturated comonomer when present is generally between 5 and 45 mole %, preferably between 10 and 35 mole %. The amount of non-fluorinated comonomer when present is generally between 0 and 50 mole %, preferably between 1 and 30 mole %.

In an embodiment where a fluoroelastomer is desired, the fluoropolymer will typically be cured. The fluoropolymer layer may be cured by any of the methods known to those skilled in the art and will typically include a cure composition such that the fluoropolymer layer can be cured. The cure composition typically includes one or more components that cause the fluoropolymer chains to link with each other thereby forming a three dimensional network. Such components may include catalysts, curing agents and/or coagents.

In one embodiment of curing the fluoropolymer layer a so called peroxide cure system may be used. In a typical peroxide cure system, the fluoropolymer is provided with one or more cure sites that comprise a halogen capable of participating in a peroxide cure reaction and the composition for providing the fluoropolymer contains an organic peroxide. The halogen capable of participating in a peroxide cure reaction is typically bromine or iodine and may be distributed along the polymer chain and/or may be contained in the end groups of the fluoropolymer. Typically, the amount of bromine or iodine contained in the fluoropolymer is between 0.001 and 5%, preferably between 0.01 and 2.5%, by weight with respect to the total weight of the fluoropolymer. It has further been found that chlorine is also capable of participating in a peroxide cure reaction of the fluoropolymer if the organic compound having MH functions is present. Accordingly, fluoropolymers that also contain chlorine atoms and/or bromine or iodine can be used for curing in a peroxide cure reaction. The amount of chlorine in the fluoropolymer may vary from 0.001% by weight to 10% by weight but is typically between 0.01% by weight and 5% by weight based on the weight of fluoropolymer. A particularly suitable polymer for use with a peroxide cure system is a polymer that includes units that are derived from CTFE or another chlorine containing monomer. Specific examples include copolymers that have a combination of CTFE-VDF-TFE-HFP as monomers. Of course a chlorine containing fluoropolymer for use in a peroxide cure system may additionally be modified with bromine and/or iodine. The fluoropolymer for use in the peroxide cure reaction typically will have a molecular weight of $10^4$ to $5 \times 10^5$ g/mol and the molecular weight distribution can be monomodal as well as bimodal or multimodal.

In order to introduce halogens, which are capable of participation in the peroxide cure reaction, along the chain, the copolymerization of the basic monomers of the fluoropolymer is carried out with a suitable fluorinated cure-site monomer (see for instance U.S. Pat. Nos. 4,745,165, 4,831,085, and 4,214,060). Such comonomer can be selected for instance from:

(a) bromo- or iodo-(per)fluoroalkyl-perfluorovinylethers having the formula:

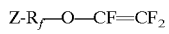

wherein Z is Br or I, $R_f$ is a (per)fluoroalkylene $C_1$–$C_{12}$, optionally containing chlorine and/or ether oxygen atoms; for example: $BrCF_2$—O—CF=$CF_2$, $BrCF_2CF_2$—O—CF=$CF_2$, $BrCF_2CF_2CF_2$—O—CF=$CF_2$, $CF_3CFBrCF_2$—O—CF=$CF_2$, and the like;

(b) bromo- or iodo(per)fluoroolefins such as those having the formula:

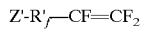

wherein Z' is Br or I, $R'_f$ is a (per)fluoroalkylene $C_1$–$C_{12}$, optionally containing chlorine atoms; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1;

(c) non-fluorinated bromo- olefins such as vinyl bromide and 4-bromo-1-butene;

(d) chlorine containing monomers including chlorine containing fluorinated monomers such as for example chlorine containing fluorinated $C_2$–$C_8$ olefins such as CTFE and non-fluorinated chlorine containing monomers such as chlorinated $C_2$–$C_8$ olefins such as vinyl chloride and vinylidene chloride.

In replacement of or in addition to the cure site comonomer, the fluoropolymer can contain a cure site component in terminal position, deriving from a suitable chain transfer agent introduced in the reaction medium during the polymer preparation, as described in U.S. Pat. No. 4,501,869 or derived from a suitable initiator. Examples of useful initiators include $X(CF_2)_nSO_2Na$ with n=1 to 10 (where X is Br or I) or an initiator composition comprising ammonium persulfate and potassium bromide.

Examples of chain transfer agents include those having the formula $R_fBr_x$, wherein $R_f$ is a x-valent (per)fluoroalkyl radical $C_1$–$C_{12}$, optionally containing chlorine atoms, while x is 1 or 2.

Examples include $CF_2Br_2$, $Br(CF_2)_2Br$, $Br(CF_2)_4Br$, $CF_2ClBr$, $CF_3CFBrCF_2Br$, and the like. Further examples of suitable chain transfer agents are disclosed in U.S. Pat. No. 4,000,356.

Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of fluoropolymer is used.

Another component which is usually included in a cure composition based on an organic peroxide, is a coagent composed of a polyunsaturated compound which is capable of cooperating with the peroxide to provide a useful cure. These coagents can be added in an amount equal to 0.1 and 10 parts per hundred parts fluoropolymer, preferably between 2 to 5 parts per hundred parts fluoropolymer. Examples of useful coagents include triallyl cyanurate; triallyl isocyanurate; triallyl trimellitate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

According to a further embodiment, the curing of the fluoropolymer may be effected using a polyhydroxy compound and the cure composition will thus comprise a polyhydroxy compound. The advantage of using a polyhydroxy compound for curing the fluoropolymer is that it will not be necessary to include special cure site components in the fluoropolymer. In addition to the polyhydroxy compound, a polyhydroxy curing system generally also comprises one or more organo-onium accelerators in addition to the polyhydroxy compound. The organo-onium compounds useful in the present invention typically contain at least one heteroatom, i.e., a non-carbon atom such as N, P, S, O, bonded to organic or inorganic moieties and include for example ammonium salts, phosphonium salts and iminium salts. One class of quaternary organo-onium compounds useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Representative examples include the following individually listed compounds and mixtures thereof:

triphenylbenzyl phosphonium chloride tributylallyl phosphonium chloride tributylbenzyl ammonium chloride tetrabutyl ammonium bromide triaryl sulfonium chloride 8-benzyl-1,8-diazabicyclo[5,4,0]-7-undecenium chloride benzyl tris(dimethylamino) phosphonium chloride benzyl(diethylamino)diphenylphosphonium chloride Another class of useful organo-onium compounds include those having one or more pendent fluorinated alkyl groups. Generally, the most useful fluorinated onium compounds are disclosed by Coggio et al. in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the art to function as a crosslinking agent or co-curative for fluoroelastomers, such as those polyhydroxy compounds disclosed in U.S. Pat. No. 3,876,654 (Pattison), and U.S. Pat. No. 4,233,421 (Worm). Representative aromatic polyhydroxy compounds include any one of the following: di-, tri-, and tetrahydroxybenzenes, naphthalenes, and anthracenes, and bisphenols of the following formula:

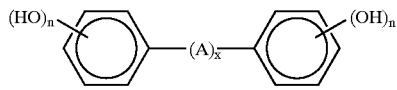

wherein A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g., —COR where R is H or a C1 to C8 alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds are also used.

One of the most useful and commonly employed aromatic polyphenols of the above formula is 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

The cure composition based on polyhydroxy compounds may further include an acid acceptor. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoropolymer.

In a further embodiment of the invention, the cure composition may comprise an organic peroxide and a polyhydroxy based cure system as described above. Such cure composition can be used with a fluoropolymer that has a halogen capable of participating in a peroxide cure reaction as well as with fluoropolymers that do not contain such halogens. If the fluoropolymer has halogens capable of participating in the peroxide cure reaction, a cure composition having a polyhydroxy compound and a peroxide can provide for a so called dual cure. The use of an organic peroxide in the cure composition is particularly beneficial if the fluoropolymer is to form a fluoroelastomer layer bonded to another elastomer that is also formed with the use of a peroxide cure system such as for example in case of a silicone based elastomer.

The fluoropolymer composition for providing the fluoropolymer layer may contain further additives, such as carbon black, stabilizers, plasticizers, lubricants, fillers, and processing aids typically utilized in fluoropolymer compounding can be incorporated into the compositions of the present invention, provided they have adequate stability for the intended service conditions.

The fluoropolymer compositions may be prepared by mixing a fluoropolymer, a cure composition and the organic compound having hydride function(s) and other additives in conventional rubber processing equipment. Such equipment includes rubber mills, internal mixers, such as Banbury mixers, and mixing extruders.

It is further possible to prepare a premix of the fluoropolymer composition whereby the premix comprises the fluoropolymer and part of other components of the full composition but not all of them. The composition of such a premix will depend on desired stability of the premix over a desired period of storage. For example, the premix may comprise the fluoropolymer, the organic compound having hydride groups MH and one or more components of a cure composition but not all of the components necessary to obtain a curable composition. For example, in case the cure composition comprises peroxide, it will generally be desired to exclude the peroxide from the premix and only add the peroxide at the time of preparing the fluoropolymer composition for preparing the fluoropolymer layer.

In a further embodiment of the present invention, the fluoropolymer layer may comprise a thermoplastic fluoropolymer, in particular a melt processible thermoplastic fluoropolymer. By the term "thermoplastic fluoropolymer" is meant a fluoropolymer that is at least partially crystalline such that a distinct melting point, typically 100° C. or more, can be identified for example through a DSC scan of the polymer. By the term "melt processible" is meant that the fluoropolymer has a melt viscosity such that it can be processed from the melt through typical melt extrusion equipment that is available. In a particular preferred embodiment of the present invention, the thermoplastic fluoropolymer is a chlorine containing fluoropolymer. Such chlorine atoms may be introduced in the fluoropolymer through copolymerization with chlorine containing fluorinated monomers or via chain transfer agents and/or initiator systems as described above. Alternatively or additionally, the thermoplastic fluoropolymer may contain bromine and/or iodine atoms which can also be introduced by copolymerization of a bromine or iodine containing comonomer, e.g. as listed above, or through the use of chain transfer agents and/or initiator systems that introduce Br or I atoms. Specific examples of thermoplastic fluoropolymers that may be used with this invention are copolymers having the following combination of monomers: CTFE-VDF; CTFE-TFE, CTFE-TFE-HFP, CTFE-TFE-HFP-VDF; CTFE-TFE-HFP-VDF-PPVE, CTFE-TFE-E; bromine or chlorine containing E-TFE copolymers and bromine or chlorine containing TFE-HFP-VDF copolymers.

In accordance with the method of the present invention for bonding a fluoropolymer layer to a substrate, a fluoropolymer composition is applied to a substrate and the fluoropolymer layer is then reacted in the presence of the organic compound having the hydride function MH to the substrate. Typically, the organic compound will be present in the fluoropolymer composition and the fluoropolymer composition may also include a cure composition as described above if an elastomeric fluoropolymer layer is desired. Preferably, effective bonding of the fluoropolymer layer is achieved through a participation of the organic compound in a free radical reaction.

Thus, in an embodiment of the invention, reacting and thereby bonding the fluoropolymer layer to the substrate is carried out by heating the fluoropolymer layer and the substrate generally in the presence of a compound having one or more groups capable of participating in a free radical reaction, such as ethylenically unsaturated groups. The compound having such groups may be present in the substrate and/or the fluoropolymer layer. For example, a compound having unsaturated groups may be the coagent of a peroxide cure composition described above. Also, in case the substrate comprises a layer of a composition that upon curing forms a silicone rubber, the composition of this layer will typically involve compounds having ethylenically unsaturated groups. Generally, reacting the fluoropolymer layer to the substrate will also involve the use of a free radical generating compound such as for example a free radical polymerization initiator. Preferably, an organic peroxide is used as a free radical generating compound in particular if the fluoropolymer layer includes a peroxide cure system as a cure composition. However, also other free radical generating compounds can be used such as for example azo compounds. Bonding of the fluoropolymer to the substrate may be effected by heating the fluoropolymer layer provided on the substrate to a temperature of 120° C. to 200° C. and for 1 to 120 min (preferably 140° C. to 180° C. and for 3 to 60 min.). The heating may further be carried out while simultaneously applying pressure.

Reaction of the fluoropolymer layer to the substrate may further be carried out by exposure of the fluoropolymer layer and substrate to actinic radiation, e.g. UV radiation. For example, if a photoinitiator is included in the substrate and/or fluoropolymer layer, bonding may be effected through the use of UV radiation.

Substrates to which the fluoropolymer layer can be bonded include substrates that have a layer comprising an elastomer. Suitable elastomers include non-fluorine type of elastomers such as silicone rubbers, acrylonitrile butadiene rubber (NBR), butadiene rubber, chlorinated and chlorosulfonated polyethylene rubber, chloroprene, copolymers of ethylene and propylene (EPM) rubber, terpolymer of ethylene, propylene, and a diene (EPDM) rubber, ethylene oxide and chloromethyl oxirane (ECO) rubber, epichlorohydrin-ethylene oxide-allylglycidylether terpolymer (GECO), polyisobutylene, polyisoprene, polysulfide, polyurethane, blends of polyvinyl chloride and NBR, styrene butadiene (SBR) rubber, ethylene-acrylate copolymer rubber, and ethylene-vinyl acetate rubber and thermoplastic elastomers derived from ethylene-propylene-diene terpolymer (EPDM) and a polypropylene. Bonding of the fluoropolymer layer to an elastomeric layer of a substrate may involve providing the fluoropolymer layer on a layer comprising a composition that upon curing forms the elastomeric layer. Such is particularly preferred when bonding the fluoropolymer layer to a silicone rubber. Further substrates include layers of fluoropolymers such as for example fluorothermoplastics. Still further, the substrate can be a metal substrate or a plastic substrate including for example a non-fluorinated polymer. Examples of non-fluorinated polymers include a polyamide, a polyolefin, a polyurethane, a polyester, a polyimide, a polystyrene, a polycarbonate, a polyketone, a polyurea, a polyacrylate, and a polymethylmethacrylate, or a mixture thereof. Polyamides useful as the non-fluorinated polymeric substrate are generally commercially available. For example, polyamides such as any of the well-known nylons are available from a number of sources. Particularly preferred polyamides are nylon-6, nylon-6,6, nylon-11, and nylon-12. It should be noted that the selection of a particular polyamide material should be based upon the physical requirements of the particular application for the multi-layer article. For example, nylon-6 and nylon-6,6 offer better heat resistance properties than nylon-11 and nylon-12, whereas nylon-11 and nylon-12 offer better chemical resistance properties. In addition, other nylon materials such as nylon-6,12, nylon-6,9, nylon-4, nylon-4,2, nylon-4,6, nylon-7, and nylon-8 can be used, as well as a polymer blend of nylon 6 and polyolefin.

Useful polyolefin polymers include homopolymers of ethylene, propylene, and the like, as well as copolymers of these monomers with, for example, acrylic monomers and other ethylenically unsaturated monomers such as vinyl acetate and higher alpha-olefins. Such polymers and copolymers can be prepared by conventional free radical polymerization or catalysis of such ethylenically unsaturated monomers. The degree of crystallinity of the polymer can vary. The polymer may, for example, be a semi-crystalline high density polyethylene or can be an elastomeric copolymer of ethylene and propylene. Carboxyl, anhydride, or imide functionalities can be incorporated into the polymer by polymerizing or copolymerizing functional monomers such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers.

Multi-layer articles having a fluoropolymer layer bonded to a substrate in accordance with the invention can be produced by any of the known methods for making multi-layer articles. For example, the layers of the multi-layer article can be prepared in the form of thin films or sheets and then laminated together by application of heat, pressure, or combinations thereof to form a bonded multi-layer article. Alternatively, each of the layers can be co-extruded to form a multi-layer article. It is also possible to form one or more of the individual layers by extrusion coating, e.g., using a crosshead die. The heat and pressure of the method by which the layers are brought together (e.g. extrusion or lamination) can be sufficient to provide adequate adhesion between the layers. It may, however, be desirable to further treat the resulting article, for example, with additional heat, pressure, or both, to enhance the bond strength between the layers. One way of supplying additional heat when the multi-layer article is prepared by extrusion is by delaying the cooling of the multi-layer article at the conclusion of the extrusion process. Alternatively, additional heat energy can be added to the multi-layer article by laminating or extruding the layers at a temperature higher than necessary for merely processing the components. As another alternative, the finished multi-layer article can be held at an elevated temperature for an extended period of time. For example, the finished article can be placed in a separate apparatus for elevating the temperature of the article such as an oven or heated liquid bath. Combinations of these methods can also be used.

Several articles in which a fluoropolymer layer is bonded to a substrate can be made according to the invention. Thus, according to one embodiment, the article may comprise a fuser member of a plain paper copier system. Such a fuser member may comprise a metal core covered with a silicone elastomer that is bonded to a fluoroelastomer fusing surface layer. Because of the use of the organic hydride compound of the invention, firm bonding between the fluoroelastomer and silicone layer can be obtained in such a fuser system which may therefore be manufactured in a more convenient and easy way without the need for intermediate adhesive layers. According to another embodiment, a hose for use in for example a turbo engine can be made in which a layer of fluoroelastomer, generally as an innermost layer, is bonded to non-fluorine rubber, in particular a silicone rubber.

According to a further embodiment, a fluoropolymer layer comprising a thermoplastic fluoropolymer may be bonded to an elastomer. Such layers of thermoplastic fluoropolymer generally represent effective barriers against solvents and fuels. Preferably, the thermoplastic fluoropolymer is a fluoropolymer that is halogenated with one or more halogens selected from chlorine, bromine and iodine. Examples of such thermoplastic fluoropolymers have been described above. By bonding such a thermoplastic fluoropolymer layer to an elastomer, fuel management systems including in particular fuel hoses can be obtained that have a high level of impermeability thereby minimizing escape of fuel from a fuel system. The thermoplastic fluoropolymer layer can be effectively bonded to a layer of elastomer that is based on fluoropolymers as well as a layer of elastomer that is based on non-fluorine containing polymers. The thermoplastic fluoropolymer layer may also be bonded to a non-fluorinated polymeric substrate.

When bonding the thermoplastic fluoropolymer layer to an elastomer layer or other polymeric substrate, the organic compound having a hydride function MH may be included in the fluoropolymer layer having the thermoplastic fluoropolymer and/or in the elastomer layer or polymeric substrate. In particular, if the elastomer layer is based on an amorphous fluoropolymer, the organic compound may conveniently be included in the elastomer layer.

Several layer arrangements of the fuel management system can be contemplated and used. For example, the thermoplastic fluoropolymer layer may be provided as an innermost layer or outermost layer in a bilayer construction. Alternatively, a multilayer arrangement can be used in which the thermoplastic fluoropolymer layer is provided between two layers. For example, a fluoroelastomer layer can be used as an innermost elastomer layer and the outermost layer can be a non-fluorinated polymer layer including a non-fluorine type of elastomer. In such a multilayer construction, the thermoplastic fluoropolymer layer can be effectively bonded to both layers as a result of the presence of the organic compound having a hydride function MH. Preferably, in the latter arrangement, the organic compound would be contained in the thermoplastic fluoropolymer layer.

Figure 2:
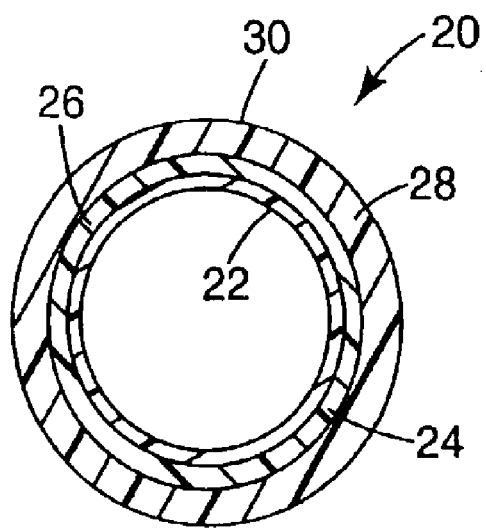

FIG. 1 and FIG. 2 further illustrate an article according to this invention in the form of a tube or hose, for example, a hose suitable for use as a fuel line or turbo charger compressed air line in an automobile system. Referring to FIG. 1, there is shown a two-layer article 10 that includes a relatively thick outer layer 16 bonded to an inner layer 14. Outer layer 16 can be the non-fluorinated polymer layer, as described above, and is designed to provide article 10 with structural integrity. Outer layer 16 forms outer surface 18 of the hose. The non-fluorinated polymer can include an elastomer (e.g., silicone rubber, ethylene acrylic rubber, and the like) and a plastic (e.g., polyamide). Inner layer 14 is a fluoropolymer. Inner layer 14 forms inner surface 12 of the hose. Inner layer 14 imparts chemical and thermal stability to the hose. Inner layer 14 also serves as a barrier or protective layer for outer layer 16 protecting it from solvent, oil or fuel. Because of solvent and permeation resistance of fluoropolymer, inner layer 14 improves the sealing properties preventing leaking at the ends of the hose. Some or all of the layers can include an additive to render them electrically conductive. To further enhance structural integrity, reinforcing aids such as fibers, mesh, braid, and/or a wire screen can be incorporated in article 10, e.g., as separate layers or as part of an existing layer.

Referring to FIG. 2, there is shown a three-layer article 20 that includes a relatively thick outer layer 28 bonded to an intermediate layer 26, which is bonded to a thinner inner layer 24. Outer layer 28 can be the non-fluorinated polymer layer, as described above, and is designed to provide article 20 with structural integrity. Outer layer 28 forms outer surface 30 of the hose. The non-fluorinated polymer can include an elastomer (e.g., nitrile rubber, epichlorohydrin rubber, and the like), which can improve the sealing properties of the article when the hose or tube is attached to a rigid connector. Inner layer 24 is a fluoroelastomer. Inner layer 24 forms inner surface 22 of the hose. Inner layer 24 imparts chemical and thermal stability to the hose. Because of solvent and permeation resistance of fluoropolymer, inner layer 24 improves the sealing properties preventing leaking at the ends. Intermediate layer 26 can be a barrier layer, which can decrease vapor or gas penetration through the wall of the hose when the hose is carrying, for example, a volatile organic solvent. The combination of inner layer 24 and intermediate layer 26 minimizes the total amount of permeation from the hose and connections within a system. Some or all of the layers can include an additive to render them electrically conductive. To further enhance structural integrity, reinforcing aids such as fibers, mesh, braid, and/or a wire screen can be incorporated in article 20, e.g., as separate layers or as part of an existing layer.

The invention will now be described with reference to the following examples without however the intention to limit the invention thereto. All parts are by weight unless indicated otherwise.

EXAMPLES

Abbreviations

Fluoroelastomer 1: TFE/HFP/VDF terpolymer, further containing minor amounts of units derived from 4-bromo-3,3,4,4-tetrafluoro butene.

Fluoroelastomer 2: bisphenol curable TFE/HFP/VDF terpolymer

FLS-2650: peroxide curable TFE/HFP/VDF terpolymer, available from Dyneon

Fluoroplastic A: Aclar® 33C, a copolymer of CTFE and VDF, available from Honeywell Fluoroplastic B: Aclar® 22C, a copolymer of CTFE and VDF, available from Honeywell TFE: tetrafluoroethylene VDF: vinylidene fluoride HFP: hexafluoropropylene CTFE: chlorotrifluoroethylene $Ca(OH)_2$: calcium hydroxide, Rhenofit CF, available from Rhein Chemie.

Carnauba wax: Flora™ 202, available from Int. Wax & Refining Co

Trigonox™ 101 45B pd: organic peroxide, available from AKZO

Perkalink™ 301-50: triallyl-isocyanurate, 50% on silicate carrier, available from Akzo TAIC: triallyl-isocyanurate, available from Nippon Kasei Varox® DBPH50: 45% 2,5-dimethyl-2,5-di(t-butylperoxy)-hexan and 5% di-t-butyl peroxide, available from R. T. Vanderbilt CaO: calcium oxide, Rhenofit F, available from Rhein Chemie N-774: Semi reinforcing furnace carbon black, available from Degussa N-990: carbon black, available from Cancarb P-0660: Phenyltris(dimethylsiloxy)silane, available from United Chemical Technologies Elastosil™ 760/70 OH, extrusion grade silicone elastomer, available from Wacker Elastosil™ 401/60 S, silicone elastomer, available from Wacker Test Methods Cure and rheological properties of fluoroelastomer compounds were evaluated using the following test methods:

Cure rheology tests were run on uncured, compounded admixtures using the Moving Die Rheometer (MDR) Model 2000E Monsanto at 177° C. on an 8 g quantity of the admixture in accordance with ASTM D 5289-93a for a rotorless rheometer. No preheat, an oscillator frequency of 100 cpm and a 0.5° arc were used. Minimum torque (ML), maximum torque (MH), and the difference between MH and ML (delta torque), were reported. Also reported were Ts2 (the time to a 2 unit rise in torque from ML; Tc50 (the time to increase torque above ML by 50% of delta torque), and Tc90 (the time to increase torque above ML by 90% of delta torque), all of which were reported in minutes.

Mooney Scorch was measured according to ASTM 1664, Part C (Measuring pre-vulcanisation characteristics), at 121° C. The minimum viscosity (Mmin) was recorded, as well as T3 (time to scorch=Mmin+3 units) and T18 (time to cure: Mmin+18 units).

Physical property testing was obtained after 150×150×2 mm$^3$ sheets were pressed and allowed to vulcanise for 7 minutes at 177° C. mold temperature, followed by post-curing treatment by heating the sheets in a circulating air oven maintained at about 200° C. for 2 hours.

Tensile Strength at Break, Elongation at Break and Stress at 100% Elongation were determined using an Instron™ mechanical tester with a 1 kN load cell in accordance with DIN 53504 (S2 die). Test specimen strips (dumbbell) were cut from post-cured sheets. All tests were run at a constant cross head displacement rate of 200 mm/min in fivefold. The values reported were averages of the five tests. Hardness Shore A (2"), Stress at 100% Elongation, Elongation at Break, and Tensile Strength at Break were reported in units of Mega Pascals (MPa), %, and MPa respectively.

Examples 1 to 3 and Comparative Examples C-1 to C-3

In examples 1 to 3 and comparative examples C-1 to C-3, curable fluoroelastomer compositions were made on a two-roll mill by mixing compounds as given in table 1. The compounds are presented in parts by weight per hundred parts by weight of fluoroelastomer (phr) as is custom in the rubber industry. Examples 1 to 3 contained 1 phr P-0660 silane, comparative examples C-1 to C-3 were made in the same way, but without the addition of silane. The cure of the resulting mixtures was analysed on 8 g samples of each mixture, using a Monsanto MDR at 177° C. Press cured sheets were prepared by pressing at 177° C. and 6.9 Mpa for 6 min. The press-cured sheets were post-cured in air at about 200° C. for 2 hrs. Physical property testing was performed on press-cured and post-cured sheets; the results are recorded in Table 2.

TABLE 1

Composition of curable fluoroelastomer composition

| Compound | Ex 1 | C-1 | Ex 2 | C-2 | Ex 3 | C-3 |
| --- | --- | --- | --- | --- | --- | --- |
| Fluoroelastomer-1 | 100 | 100 | / | / | / | / |
| Fluoroelastomer-2 | / | / | 100 | 100 | / | / |
| FLS-2650 | / | / | / | / | 100 | 100 |
| Ca(OH)$_2$ | 5 | 5 | 5 | 5 | 5 | 5 |
| Trigonox 101 45B pd | 1 | 1 | 1 | 1 | 1 | 1 |
| Perkalink 305-50 | 6 | 6 | 6 | 6 | 6 | 6 |
| CaO | 5 | 5 | 5 | 5 | 5 | 5 |
| N-774 | 15 | 15 | 15 | 15 | 15 | 15 |
| Carnauba wax | 0.75 | 0.75 | 0.75 | 0.75 | 0.75 | 0.75 |
| Bisphenol AF | 1 | 1 | / | / | / | / |
| Onium* | 1.5 | 1.5 | / | / | / | / |
| P-0660 | 1 | / | 1 | / | 1 | / |

Note:
onium*: Tributylmethoxypropyl phosphoniumchloride complex

TABLE 2 physical properties of fluoroelastomers

| | Ex 1 | C-1 | Ex 2 | C-2 | Ex 3 | C-3 |
| --- | --- | --- | --- | --- | --- | --- |
| Monsanto MDR (177° C., test time: 6 min) | | | | | | |
| ML (inch.pounds) | 1.1 | 1.7 | 0.8 | 0.8 | 1.9 | 2.0 |
| MH (inch.pounds) | 6.0 | 4.9 | 15.3 | 11.4 | 12.9 | 11.5 |
| MH-ML (inch.pounds) | 4.9 | 3.2 | 14.5 | 10.6 | 11.0 | 9.5 |
| Ts2 (min) | 2.9 | 3.3 | 0.7 | 1.9 | 1.3 | 1.2 |

TABLE 2-continued physical properties of fluoroelastomers

|  | Ex 1 | C-1 | Ex 2 | C-2 | Ex 3 | C-3 |
|---|---|---|---|---|---|---|
| Tc50 (min) | 3.4 | 2.6 | 1.1 | 3.0 | 2.3 | 1.9 |
| Tc90 (min) | 5.4 | 5.1 | 3.5 | 5.0 | 4.6 | 4.5 |
| Mooney Scorch (@ 121° C.) | | | | | | |
| Mmin (inch.pounds) | 38 | 46 | | | 56 | 58 |
| T3 (min) | 34 | >60 | | | 47 | 32 |
| T18 (min) | >60 | >60 | | | >60 | >60 |
| Vulcanisate properties (press cured 7 min @ 177° C., post cured 2 hrs @ 200° C.) | | | | | | |
| Hardness shore A (2") | | | 73 | 73 | 72 | 72 |
| Modulus 100% (Mpa) | | | 7.5 | 3.4 | 4.0 | 4.4 |
| Tensile (Mpa) | | | 18.5 | 14.0 | 13.4 | 11.8 |
| Elongation (%) | | | 210 | 328 | 277 | 255 |
| Die C tear (kN/m) | | | 21 | 27 | 22 | 21 |

The results in table 2 indicate that the in all cases, fluoroelastomers with good physical properties were obtained.

In order to evaluate the adhesion between the above fluoroelastomers and various silicone rubbers, laminates of fluoroelastomer/silicone rubber were made. Therefore, sheets were made of the curable fluoroelastomer compositions of about 2 mm thickness and of VMQ compositions of about 5–7 mm for making silicone rubbers. From these sheets, strips were cut of about 2.5×7 cm. A narrow strip of PTFE film was inserted between the curable fluoroelastomer composition and VQM strips, at an edge for about 1.5 cm. The PTFE film did not adhere to any of the compositions, and was used only to create two tabs for insertion into each jaw of an adhesion testing apparatus. The lamination was accomplished using a hot press at 177° C. for 30 min. The superposed strips of curable fluoroelastomer composition and VMQ compounds, having a total thickness of about 7–9 mm were pressed in a mold of 6 mm in depth. The high temperature and press assured vulcanization and the formation of a bond between the two layers. After cooling to room temperature for 4 hours, the laminated sheets were cut to a width of about 1.27 to 2.54 cm. The adhesion between the two layers was measured according to ASTM D-1876, using a Sintech Tester 20 (available from MTS Systems Corporation), with a cross head speed of 50 mm/min. The results, as given in table 3 are the average values of at least three specimens.

TABLE 3 adhesion between fluoroelastomer/silicone laminates

| Bond strength (N/mm) | Ex 1 | C-1 | Ex 2 | C-2 | Ex 3 | C-3 |
|---|---|---|---|---|---|---|
| VMQ A | — | — | >5.7 (RT) | 0 (IF) | | |
| VMQ B | — | — | >4.5 (RT) | 0.8 (IF) | | |
| VMQ C | — | — | 2.6 (IF/RT) | — | | |
| VMQ D | 1.1 (IF) | 0 (IF) | >5.2 (RT) | 0.8 (IF) | | |
| Elastosil 401/60S | | | | | 5.2 RT | 5.5 RT |
| Elastosil 760/70 OH | | | | | 5.1 RT/IF | 0.7 IF |

Notes:
IF = interfacial failure, real indication of bond strength
RT = rubber tear, indicated that the bond was stronger than the elastomer itself. The value recorded was max value.

TABLE 3-continued adhesion between fluoroelastomer/silicone laminates

| Bond strength (N/mm) | Ex 1 | C-1 | Ex 2 | C-2 | Ex 3 | C-3 |
|---|---|---|---|---|---|---|

VMQ A–D: VMQ compounds of different composition typically used in making turbo charger hoses
Since the Elastosil ™ samples did not contain curatives, additional 1.5 phr Trigonox ™ was used to make the laminates.

The results in table 3 indicate a significant increase in adhesion between the fluoroelastomers produced in the presence of the silane and silicone rubbers produced from a variety of VMQ compositions. Whereas the comparative examples did not show good adhesion to VMQ compounds (except with Elastosil™ 401/60S), a good to very strong adhesion (rubber tear) was noticed for the fluoroelastomers produced with a silane.

Examples 4 and 5 and Comparative Examples C-4 and C-5

Fluoroelastomer compounds were made using a two roll mill by compounding 100 parts FLS-2650, 30 parts N-990, 3 parts calcium hydroxide (available from C. P. Hall), 2.5 parts Varox® DBPH-50, 2.5 parts TAIC and 1 part P-0660. 10 cm×10 cm sheets of about 1.5 mm thickness of curable fluoroelastomer composition were made, adjusting the gap of the roll mill. One sheet of curable fluoroelastomer composition was laminated against a 10 cm×10 cm sheet of fluoroplastic A, having a thickness of 0.05 mm (example 4) and another sheet of curable fluoroelastomer composition was laminated against a 10 cm×10 cm sheet of fluoroplastic B, having a thickness of 0.038 mm (example 5). For comparative examples C-4 and C-5, curable fluoroelastomer compositions were made as for examples 4 and 5, except that no P-0660 was added. The comparative compounds were laminated against fluoroplastic A (comparative example C-4) or against fluoroplastic B (comparative example C-5). The laminates were made using a hot press at 177° C. for 3 minutes. A 15.2 cm×15.2 cm shim stock with 1.25 mm thickness was used to keep the thickness of the laminate under the heat press. The samples were removed from the press and allowed to cool to room temperature. The resulting samples were cut into three 25.4 mm wide strips. Peel or adhesion strength were measured on the three strips in accordance with ASTM D-1876, using an Instron™ Model 1125 tester (available from Instron Corp.), with a cross head speed of 100 mm/min. In order to facilitate testing of the adhesion between the two layers, a 0.05 mm thick polyester was inserted. The results, as given in table 4 are the average values of at least three specimens (only the middle 80% of the sample was taken into account).

TABLE 4 adhesion between fluoroelastomers and chlorine containing fluoroplastics

| Example No | Chlorine containing fluoroplastic | —SiH co-agent (phr) | Peel strength (N/mm) |
|---|---|---|---|
| 4 | Fluoroplastic A | 1 | 1.35 IF |
| 5 | Fluoroplastic B | 1 | 1.45 IF |
| C-4 | Fluoroplastic A | 0 | 0.12 IF |
| C-5 | Fluoroplastic B | 0 | 0.28 IF |

The data in table 4 show that substantially improved adhesion between fluoroelastomers and chlorine containing fluoroplastics could be obtained if a —SiH co-agent was added to the curable fluoroelastomer composition.

What is claimed is:

1. Fluoropolymer composition comprising:

(a) a fluoropolymer;
   (b) a cure composition comprising a polyhydroxy compound and an organic peroxide; and
   (c) an organic compound comprising a hydride function MH, wherein M is selected from Si, Ge, Sn and Pb.

2. Fluoropolymer composition according to claim 1 wherein said cure composition further comprises an onium compound.

3. Fluoropolymer composition comprising:

(a) a fluoropolymer;
   (b) a cure composition comprising a polyhydroxy compound; and
   (c) an organic compound corresponding to the formula:

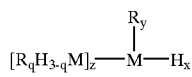

wherein R represents a hydrocarbon group optionally comprising one or more substituents and wherein the R groups may be the same or different and whereby two R groups may be linked to each other so as to form a ring, M is selected from Si, Ge, Sn and Pb, q is a value of 1 to 3, x is a value of 1 to 3, y and z represent a value of 0 to 3 and the sum of y+z=4−x.

4. Fluoropolymer composition comprising:

(a) a fluoropolymer;
   (b) a cure composition comprising a polyhydroxy compound; and
   (c) an organic compound comprising a hydride function MH, wherein M is selected from Ge, Sn and Pb.

* * * * *